No. 623,231. Patented Apr. 18, 1899.
P. ARGALL.
MULTITUBULAR ORE COOLER.
(Application filed Nov. 1, 1898.)
(No Model.) 4 Sheets—Sheet 1.
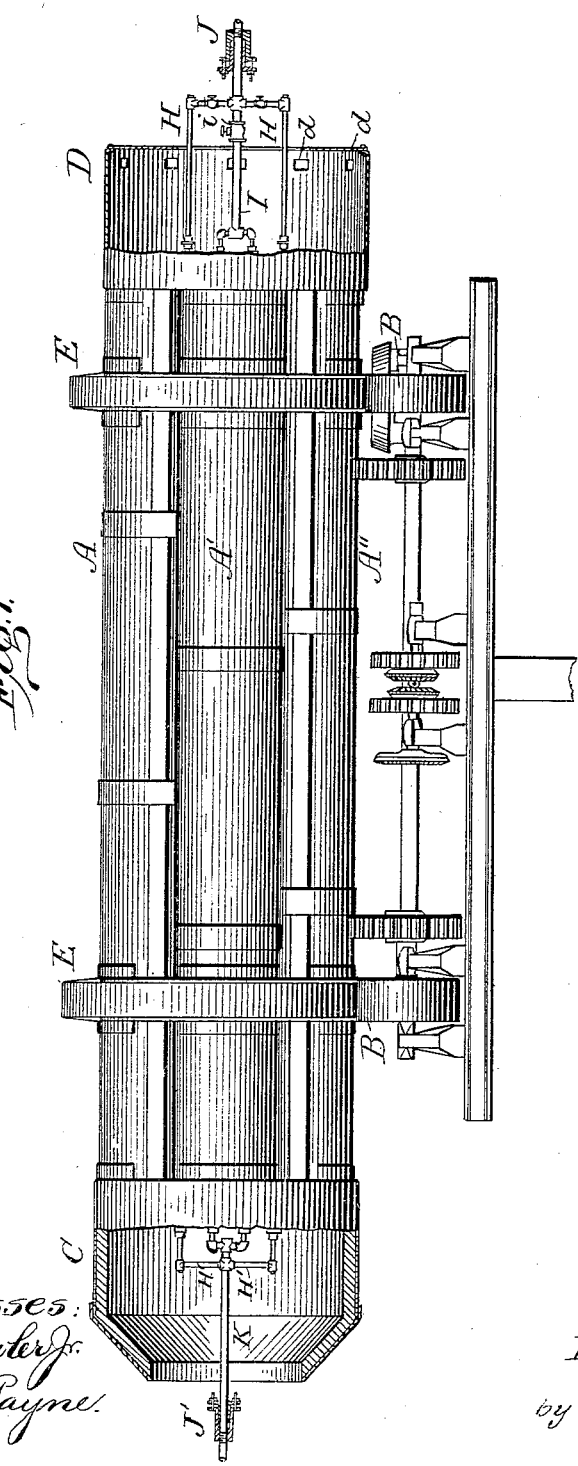
Witnesses:
J. M. Fowler Jr.
W. B. Payne.
Inventor:
Philip Argall,
by Henry H. Bates,
Attorney.

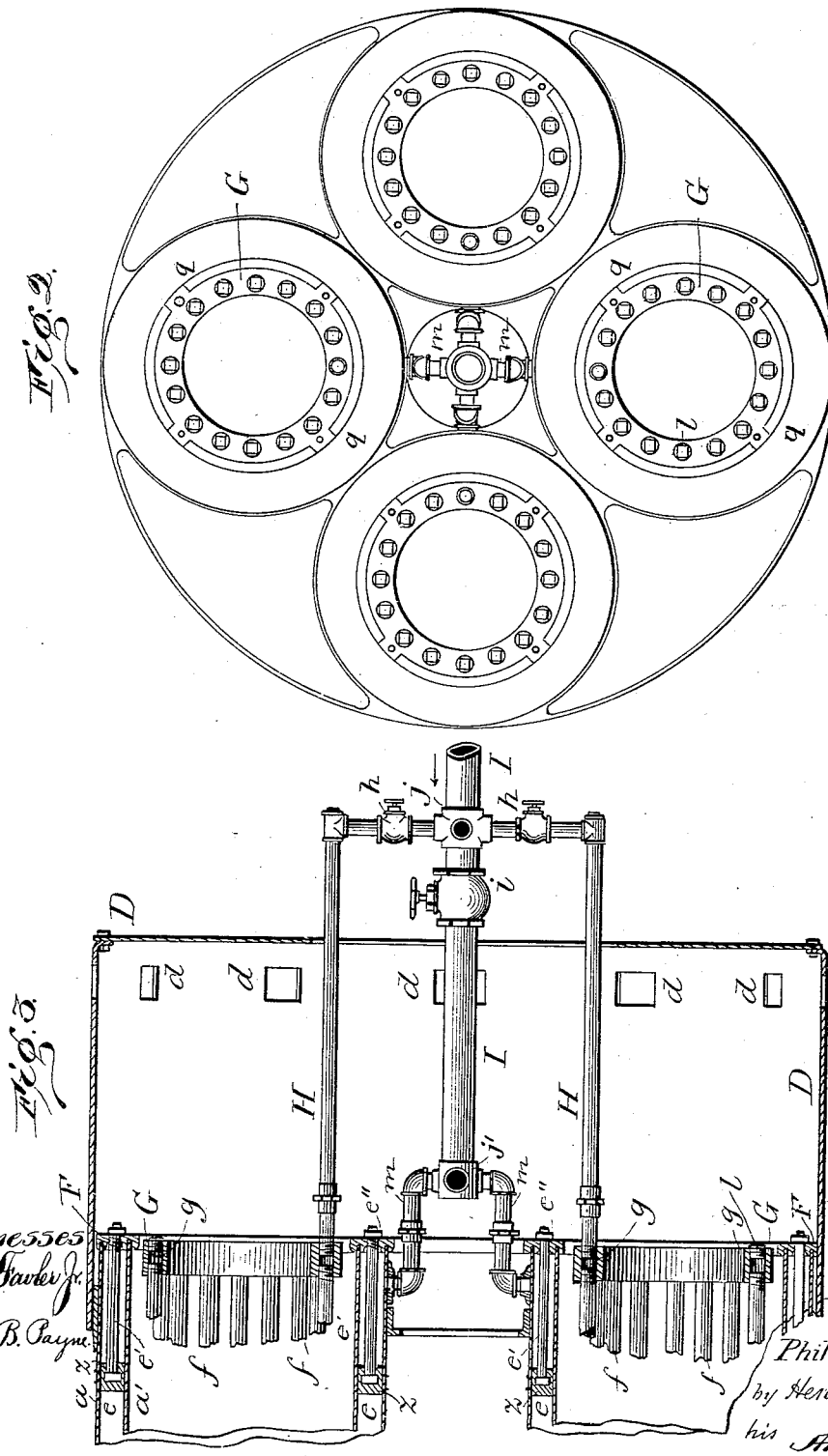

No. 623,231. Patented Apr. 18, 1899.
P. ARGALL.
MULTITUBULAR ORE COOLER.
(Application filed Nov. 1, 1898.)
(No Model.) 4 Sheets—Sheet 3.
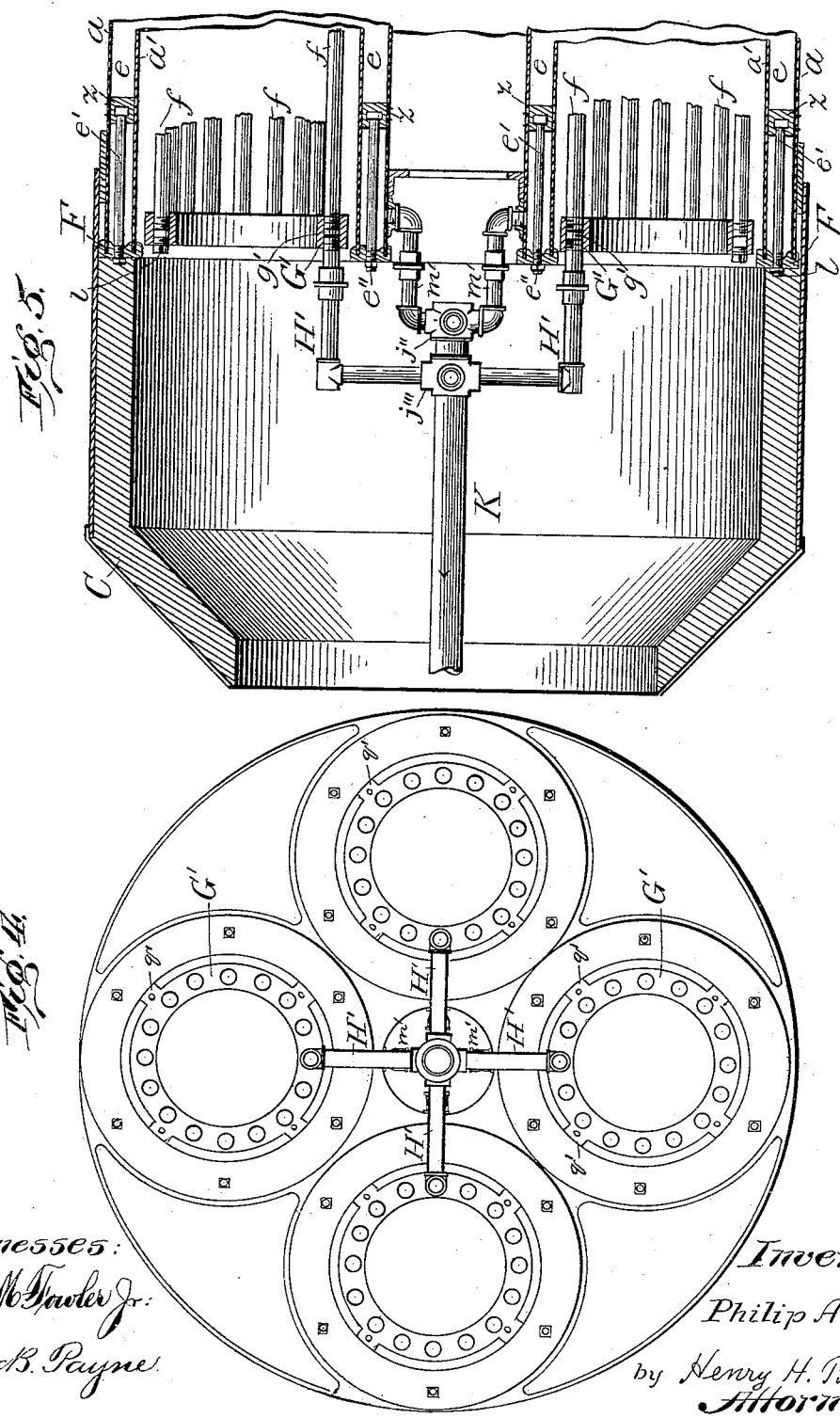

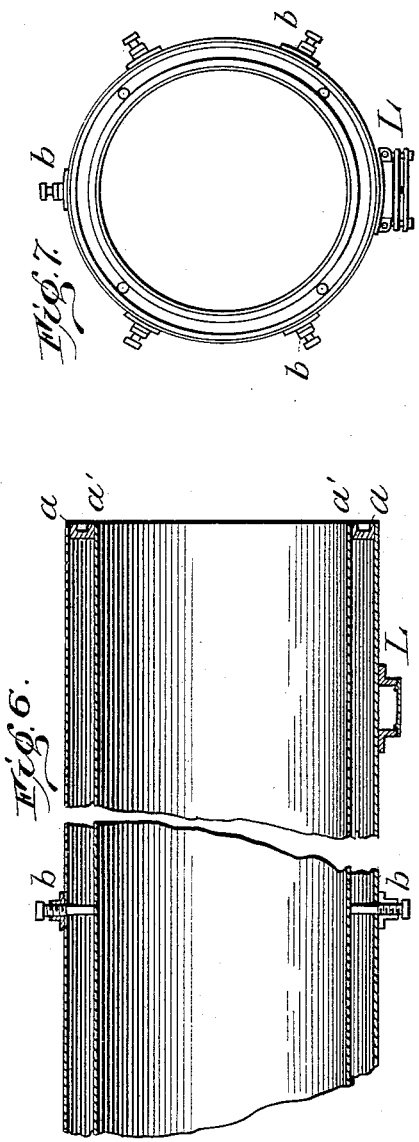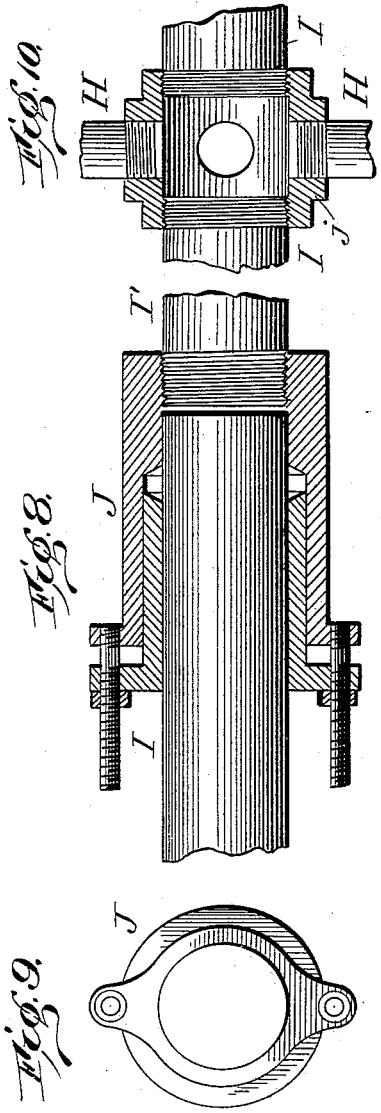

UNITED STATES PATENT OFFICE.

PHILIP ARGALL, OF DENVER, COLORADO.

MULTITUBULAR ORE-COOLER.

SPECIFICATION forming part of Letters Patent No. 623,231, dated April 18, 1899.

Application filed November 1, 1898. Serial No. 695,246. (No model.)

*To all whom it may concern:*

Be it known that I, PHILIP ARGALL, a citizen of the United States, residing at Denver, in the county of Arapahoe and State of Colorado, have invented certain new and useful Improvements in Multitubular Ore-Coolers; and I do hereby declare the following to be a full, clear, and exact description of the invention, such as will enable others skilled in the art to which it appertains to make and use the same.

My invention relates to the cooling of ores; and it consists of a rotary multitubular apparatus similar in some respects to that shown and described in my Patent No. 591,909, of October 19, 1897, for an apparatus for roasting and drying ores, but modified and reorganized for the opposite function of cooling instead of heating the ore, the fire-brick being removed from the tubes and replaced by a water circulation, a system of water-circulating pipes being also introduced into the interior of each tube, as will be hereinafter described in detail with other minor details.

By means of this improved cooling apparatus the red-hot ores from the roasting-furnace can be cooled down to ordinary temperature in one operation in a few minutes of time with a great saving of the hand labor heretofore employed in turning over the ores on cooling-floors, as well as the no less important element of the saving of time. It is particularly useful in cyanid and chlorination works, where the crushed ore has to be roasted and subsequently cooled down to ordinary temperature before it can be taken in hand for chemical treatment. The apparatus is also useful for cooling any fine furnace product.

In the drawings forming a part of this specification, Figure 1 is a side elevation, partly in section and broken in the center, of my improved rotary multitubular ore-cooling apparatus. Fig. 2 is an end view of the apparatus at the discharge end, with the discharge-hood and the inlet-pipes removed. Fig. 3 is a central longitudinal section of the discharge end of the device, showing the circulatory system of piping at the inlet end of said system. Fig. 4 is an end view of the feed end of the apparatus, with the hood removed. Fig. 5 is a central longitudinal section of the feed end of the apparatus, showing the circulatory system of piping at the discharge end thereof. Fig. 6 is a longitudinal section of a portion of one of the tubes, showing the annular water-space, the screw bearing-studs, and the mud-hole. Fig. 7 is an end view of Fig. 6. Fig. 8 is a longitudinal section of the stuffing-box and gland for the water-pipes. Fig. 9 is an end view of Fig. 8. Fig. 10 is a longitudinal section of the distributing-coupler on inlet and outlet pipes.

Like letters of reference indicate like parts on the drawings.

In the drawings, A A' A'' denote the several tubes of my multitubular ore-cooler arranged about a common axis and symmetrically bound together, so as to rotate as one cylinder.

E E are circular track-bands which encircle and sustain the multiple cylinder and on which it revolves through the agency of the bearing-rollers B B, which support the same and impart rotary movement to it by means of suitable power applied thereto through appropriate gearing. The multiple cylinder is in practice set at an angle of inclination from the level of about one foot in twelve to provide for the advance of the ore from the entrance to the discharge end of the apparatus. At the feed end there is a cylindrical hood C, preferably lined with fire-brick $c$ to protect the steel shell from the red-hot ore which is deposited therein. At the discharge end is also a cylindrical hood D, of the full diameter of the multiple cylinder, provided with discharge-openings $d$ $d$ near the extremity thereof.

The cooler-tubes A A', &c., of the multiple cylinder are constructed as follows:

$a$ is an outer shell, and $a'$ is an inner shell, of metal, preferably steel plate, the inner shell so located within the outer shell as to leave an annular water space or chamber $e$ all around. The ends of said water-space are closed by annular castings F F, secured to the shells in any workmanlike manner, but preferably by means of anchoring-bolts $e'$ $e'$, located in the water-spaces $e$ affixed, at one end to the outer shell by a block $z$, riveted or otherwise secured to the same and passing through the castings at the other end, securing the same by means of nuts $e''$. Within the inner shells at each end are inserted annular hollow head-castings G G', secured by bolts and nuts or in any workmanlike manner to the aforesaid annular castings F F. Between these head-castings are inserted a series of pipes or tubes $ff$, running from end to end and secured in said castings, so as to be in communication with the annular spaces $g$ therein. Communicating with said annular spaces at the discharge end of the apparatus are four pipes H H, (two shown in Fig. 3,) one to each cooler-tube, which by means of suitable bends and couplers are in communication with a main inlet-pipe I. Said pipes H H are provided with suitable valves $h\ h$, as is also the main inlet-pipe valve $i$. The main inlet-pipe is also provided with a stuffing-box and gland J, Figs. 8 and 9, to permit of its rotation with the cylinder while fed by the stationary portion I', Fig. 8. A distributing-union $j$ (illustrated in section in Fig. 10) provides for distributing the incoming water to the four pipes H H and thence to the annular water-spaces $g$ by means presently to be described.

On the inner end of pipe I is a distributing-union $j'$, somewhat similar to union $j$, connecting pipe I to four branch pipes $m\ m$, communicating through suitable bends and couplings with the annular water-spaces $e$ through outer shells $a$. At the feed end of the apparatus are also four pipes H' H' in communication with the annular spaces $g'$, which by suitable bends and couplings are in communication with a main discharge-pipe K. Said pipe K is provided with a stuffing-box and gland J' the same as pipe I and for the same purpose. The main discharge-pipe K is also in communication with annular water-spaces $e$ by means of pipes $m'\ m'$ and suitable bends and couplings.

$j''$ is the coupling or union connecting pipes $m'\ m'$ with the main discharge-pipe K, and $j'''$ is the coupling or union connecting pipes H' H' with said main discharge-pipe.

The inner shell $a'$ of the cooler-tube is held stiffly in position relatively to the outer shell $a$ by bearing screw-studs $b$, running in threaded sockets secured to the outer shell, thus admitting of adjustment and firmly supporting the inner shell while not interfering with the free expansion and contraction of the two shells relatively to each other. Mud-holes L are also provided at suitable intervals, having removable covers to afford access to the interior water-spaces between the shells and permit the removal of foreign substances therefrom.

The annular hollow head-castings G G' are in practice perforated through and through on both sides and tapped with screw-threads to receive the screw-threaded pipes $ff$. The outer perforations are also screw-threaded to receive screw-threaded plugs $l\ l$, which can be removed to afford access to the interior of pipes $ff$.

The mode of operation is as follows: The hot ore from the roasting-furnace is delivered and fed directly into the circular opening in the hood at the feed end of the rotary cooler, Fig. 5, by any suitable means, the current of cooling water having meantime been turned on at the cool end of the machine and the machinery set in motion. The cold water enters through main inlet-pipe I and passes through branch pipes $m\ m$ into the annular water-spaces $e$ between the shells $a$ and $a'$. It fills these spaces and passes out through branches $m'\ m'$ into main discharge-pipe K. The cold water also passes through branch pipes H H into the annular spaces $g\ g$ of hollow head-casting G and thence through pipes $ff$ to hollow head-castings G', from whence it is conveyed through branch pipes H' H' to main discharge-pipe K. The combined flow through said main discharge-pipe is allowed to flow away, if water is abundant, or it may be utilized for its contained heat to feed boilers or for heating purposes about the works, or it may be collected and cooled for reuse. As the multiple cylinder revolves the ore gradually advances through the multiple tubes and comes in contact with the cooled surface of the inner shell and also with the cooled tubes $ff$, by which its heat is rapidly abstracted, so that when it reaches the discharge-hood it is practically cool enough for delivery. The water, however, gradually advancing toward the hot end of the apparatus, takes up this heat and is discharged at a high temperature.

A four-tube cooler of the capacity now in use is capable of cooling three hundred tons of roasted ore per day.

I claim and desire to secure by Letters Patent—

1. A rotary ore-cooler, consisting of a plurality of cylinders arranged about a common axis, each cylinder comprising an outer and an inner shell with an annular space between, closures for said annular spaces at the ends thereof, means for rotating said group of cylinders on its axis, and means for supplying water to said annular spaces and for discharging it therefrom while the cylinders are in rotation, substantially as specified.

2. A rotary ore-cooler, consisting of a plurality of cylinders arranged about a common axis, each cylinder comprising an outer and an inner shell with an annular space between, closed at the ends, means for rotating said group of cylinders on its axis, a common receiving-hood for said group of cylinders at the feed end of the apparatus, a common discharge-hood at the discharge end, discharge-apertures in said discharge-hood, and means for supplying water continuously to said annular spaces at one end and for discharging the water therefrom at the other end of the apparatus while the cylinders are in rotation, substantially as specified.

3. A rotary ore-cooler, consisting of a plurality of cylinders arranged about a common axis, each cylinder comprising an outer and an inner shell with an annular space between, closed at the ends, means for rotating said group of cylinders on its axis, cylindrical hoods C and D at the feed and discharge ends of said group respectively, annular hollow heads within the inner shell of each cylinder at the ends thereof respectively, longitudinal tubes between said hollow heads connecting the same, means for supplying water continuously to said annular spaces and to said hollow heads and intermediate tubing while the cylinders are in rotation, and means for discharging the water from said annular spaces and from said hollow heads and intermediate tubing while said cylinders are in rotation, substantially as specified.

4. In a rotary ore-cooler, a plurality of cylinders arranged about a common axis, each cylinder comprising an outer and an inner shell with an annular space between, closed at the ends, means for rotating said group of cylinders on its axis, cylindrical hoods C and D at the feed and discharge ends of said group respectively, annular hollow heads within the inner shell of each cylinder at the ends thereof respectively, longitudinal tubes between said hollow heads connecting the same, pipes $m$ $m$, for supplying water to said annular spaces, pipes H H for supplying water to said hollow heads, distributing-unions $j j'$, a main supply-pipe I having a stuffing-box J, pipes $m'$ $m'$ for receiving water from said annular spaces, pipes H' H' for receiving water from said hollow heads, connecting-unions between said pipes H', H', $m'$, $m'$ and discharge-pipe K, and a main discharge-pipe K, having a stuffing-box J', substantially as specified.

5. In a rotary cooler, a plurality of cylinders, each consisting of an outer and an inner shell with an annular space between, a head-casting on each end thereof closing said annular space, annular hollow heads secured to said head-castings, circular series of longitudinal pipes $f f$ between said hollow heads connecting the same, and screw-plugs $l$ in said hollow heads, opposite the openings of pipes $f f$, affording access to the latter, substantially as specified.

6. In a rotary ore-cooler, a cylinder consisting of an outer shell and an inner shell with an annular space between, a head-casting on each end of said cylinder closing said annular space, bolts $e'$ $e'$ in said annular space secured to said shells at the inner end of said bolts, screw-threaded at the outer end to receive a nut, and passing through apertures in said head-castings whereby the latter are removably secured in place, substantially as specified.

In testimony whereof I affix my signature in presence of two witnesses.

PHILIP ARGALL.

Witnesses:
ALEXANDER S. STEUART,
HENRY H. BATES.